May 21, 1940.  J. STEIN  2,201,412
TAMPON
Filed Sept. 27, 1937
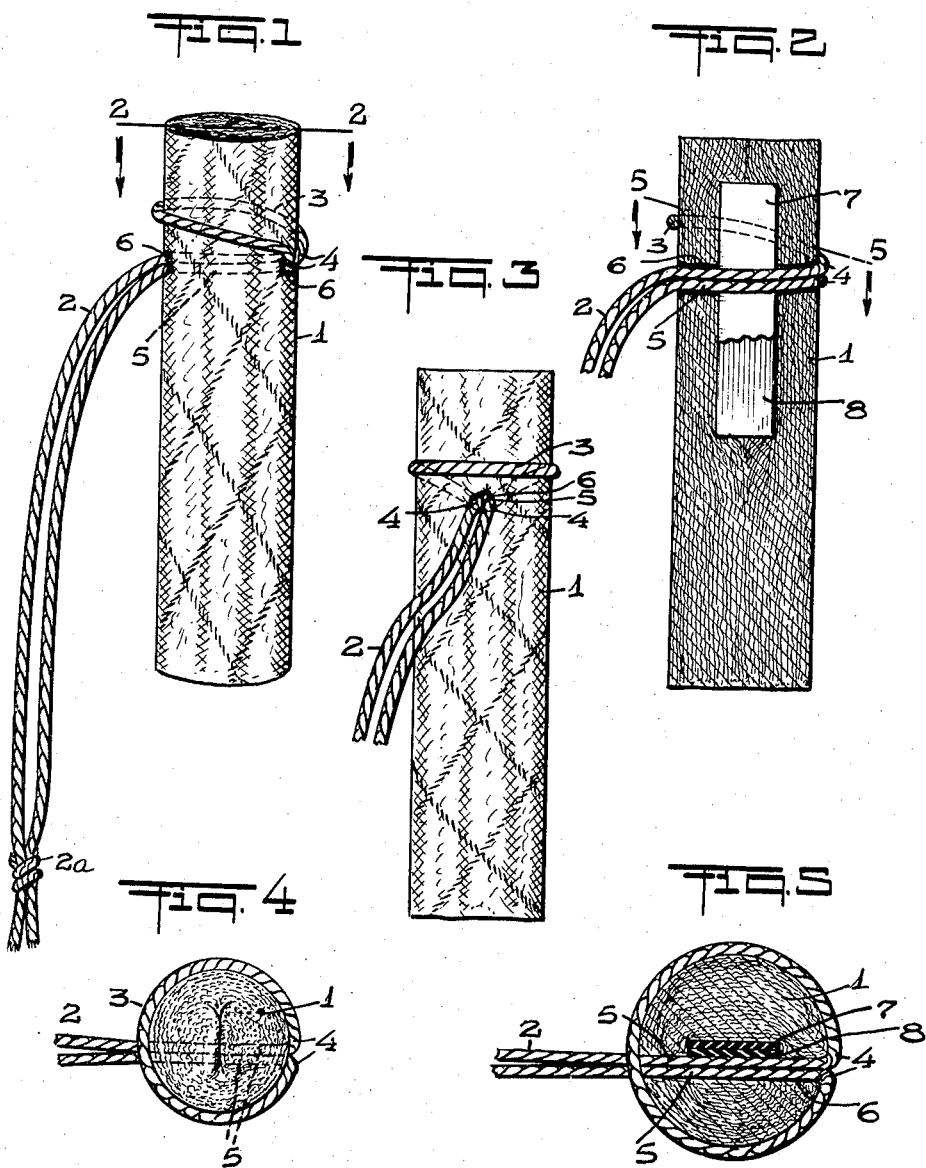
INVENTOR.
Jacob Stein
BY Mock & Blum
ATTORNEYS Patented May 21, 1940

2,201,412

UNITED STATES PATENT OFFICE 2,201,412

TAMPON

Jacob Stein, New York, N. Y.

Application September 27, 1937, Serial No. 165,819

2 Claims. (Cl. 128—285)

My invention relates to a new and improved tampon which can be used as a menstrual tampon, for dressing wounds and the like.

The invention also relates generally to surgical bandages and for other purposes where it is desired to absorb body secretions or emissions.

Another object of the invention is to provide a device of this kind which includes a rubber member or members, said rubber member or members being of special composition, so that they can inhibit the growth of bacteria.

Likewise, said special rubber member or members can diminish or inhibit decomposition of the secretions or emissions, thus preventing or diminishing objectionable odors.

Other objects of my invention will be stated in the annexed description and drawing.

Fig. 1 is a perspective view of a menstrual tampon made according to my invention.

Fig. 2 is a sectional view on the line 2—2 of Fig. 1.

Fig. 3 is a front elevation of the device shown in Fig. 1.

Fig. 4 is a top view of Fig. 1.

Fig. 5 is a sectional view on the line 5—5 of Fig. 2.

The tampon has absorbent material which may be of any shape or construction. For purposes of illustration, I have shown a tampon 1, which is made of layers of absorbent cellulose material. Said cellulose material surrounds the inner rubber members 7 and 8, said rubber members 7 and 8 being directly adjacent to each other. Said rubber members 7 and 8 may be of any shape.

A cord 2 is provided with a loop 3 which surrounds a portion of the outer wall of the tampon. Said loop 3 may fit tightly upon the outer wall of the tampon. As shown in Fig. 1, the cord 2 has its ends connected to each other by means of a knot 2a. The two ends of the cord 2 pass through a passage or channel formed in the body of the tampon. The channel-portions 5 of the cord 2 are shown in broken lines in Fig. 1. Said channel has openings 6, through which the channel-portions 5 pass.

The loop 3 maintains the absorbent material in cylindrical form.

I can have any desired number of the rubber members 7 and 8, or I can use a single rubber member. The rubber members may be in the form of fine shreds or particles which are intermixed uniformly with the absorbent material of the tampon. This absorbent material may be of any type, such as woven surgical gauze or the like.

Any construction can be utilized whereby the absorbent material takes up the secretion or emission, and said absorbent material contacts with one or more rubber members or rubber bodies.

The special type of rubber member which I utilize contains or is combined with an antiseptic or deodorant.

The body emission or secretion takes up the antiseptic or deodorant from the rubber body so that the antiseptic or deodorant is spread more or less uniformly through the moist absorbent material.

I can add a substance to the rubber material which is a combined antiseptic and deodorant.

The improved tampon is bendable but it has sufficient rigidity to maintain it in normal predetermined shape. The rubber members 7 and 8 are preferably thin elastic sheet rubber.

The absorbent material may be coated or impregnated at spaced portions of said absorbent material, with the improved rubber material.

Therefore, there are numerous ways of combining the special type of rubber material with an absorbent material and the invention covers every device in which the secretion or emission which is taken up by said absorbent material, can take up from said special rubber material, an antiseptic or a deodorant, or a substance which acts both as an antiseptic or a deodorant.

The rubber material may be vulcanized or unvulcanized, but it is preferably vulcanized.

There are various types of rubber material which can be used in the improved tampon, and the following examples are intended to specify certain improved methods of making said rubber material, without limiting the invention to any particular type of rubber material, which has the aforesaid properties.

The rubber material, vulcanized or unvulcanized, can be treated with a solution of oxyquinoline. The oxyquinoline can be dissolved in acetone or in other suitable solvent, such as ethylene dichloride, or in methanol, or in a mixture of methanol and water. The rubber will adsorb the oxyquinoline. The oxyquinoline will be released from the rubber, when the rubber contacts with a body secretion or a body emission.

The concentration of the oxyquinoline in the solution may be from ½% to 5%, said proportion being by weight. The strength of the solution can be varied. The unvulcanized rubber can be masticated with said solution in a suitable mill.

The rubber can then be vulcanized at low temperature by means of sulphur chloride or the like. The thickness of the rubber member may be from .004 inch to .030 inch.

The rubber sheet which has been thus treated can take up one one-hundredths percent of oxyquinoline or more.

The rubber can also be caused to adsorb mixtures of phenols, and quinolines, or mixtures of phenols and oxyquinolines, in single or mixed solutions.

For example, the rubber can be treated with an acetone solution which has ½% of oxyquinoline, and ½% of p-chlor-m-xylenol, said proportions being by weight. The vulcanized rubber material is preferably elastic.

A rubber member of this type can neutralize the acids which are found in perspiration and in other body secretions, as said rubber member also inhibits the growth of bacteria and it inhibits putrefaction.

The rubber material can also be made by treating the rubber, vulcanized or unvulcanized with the vapor of oxyquinoline. Thin elastic sheet rubber which has been vulcanized, can be exposed to the vapor of oxyquinoline in a closed chamber at a temperature of 120° F. to 160° F. The sheets of vulcanized rubber are maintained at said temperature in order to prevent the oxyquinoline vapor from condensing on the rubber material. The rubber material can adsorb oxyquinoline vapor in the proportion of one one-thousandth per cent to ½%.

Unvulcanized rubber can be masticated with the oxyquinoline in dry and solid form. The mastication produces enough heat to raise the temperature of the unvulcanized rubber to about 200° F. The oxyquinoline is thus vaporized and its vapors permeate the unvulcanized rubber.

The rubber can then be vulcanized at low temperature by means of sulphur chloride.

The rubber material can also be made by successive treatment with suitable acid and basic materials. For example, the rubber material, vulcanized or unvulcanized, can be first treated with an acid substance which contains a group which can react with rubber so as to add the acid radical of the acid material to the double bond in the rubber.

An example of such material is chlorsulfonic acid. The rubber can be treated with a solution of said acid in carbon tetrachloride, chloroform or the like. This solution can contain from ½% to 5% of the chlorsulfonic acid by weight.

The solvent is allowed to evaporate. The rubber can then be treated with basic compounds or materials such as the quinolines, phosphines, acridines.

Generally speaking, the improved rubber can be made by the methods stated in any of the following applications, which have been filed in the United States Patent Office: Serial No. 121,559, filed January 21st, 1937; Serial No. 121,558, filed January 21st, 1937; Serial No. 55,680, filed December 21st, 1935; Serial No. 8,146, filed February 26th, 1935; Serial No. 36,064, filed August 14th, 1935; Serial No. 53,906, filed December 11th, 1935.

I claim:

1. A tampon of the character described, comprising a rubber member, an absorbent material enclosing said rubber member, said rubber member being adapted to release an antiseptic material into body secretions or emissions contacting therewith.

2. A tampon of the character described, comprising a cylindrically shaped body member of absorbent material, said body member completely enclosing a second member made of rubber, said rubber member being adapted to release an antiseptic material into body secretions or emissions contacting therewith, said rubber member being vulcanized and bendable.

JACOB STEIN.